US012003001B2

(12) United States Patent
Lee

(10) Patent No.: US 12,003,001 B2
(45) Date of Patent: Jun. 4, 2024

(54) SECONDARY BATTERY, METHOD FOR MANUFACTURING THE SECONDARY BATTERY, AND BATTERY MODULE INCLUDING THE SECONDARY BATTERY

(71) Applicant: LG Energy Solution, Ltd., Seoul (KR)

(72) Inventor: Jae Chan Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 149 days.

(21) Appl. No.: 17/424,386

(22) PCT Filed: Jun. 26, 2020

(86) PCT No.: PCT/KR2020/008324
§ 371 (c)(1),
(2) Date: Jul. 20, 2021

(87) PCT Pub. No.: WO2021/002635
PCT Pub. Date: Jan. 7, 2021

(65) Prior Publication Data
US 2022/0102822 A1   Mar. 31, 2022

(30) Foreign Application Priority Data
Jul. 3, 2019 (KR) ........................ 10-2019-0080175

(51) Int. Cl.
*H01M 10/658* (2014.01)
*H01M 10/42* (2006.01)
(Continued)

(52) U.S. Cl.
CPC ..... *H01M 50/581* (2021.01); *H01M 10/4257* (2013.01); *H01M 10/486* (2013.01);
(Continued)

(58) Field of Classification Search
CPC ............ H01M 50/581; H01M 10/658; H01M 10/4257; H01M 10/486; H01M 2010/4271; H01M 2200/105; H01M 2200/106
See application file for complete search history.

(56) References Cited

U.S. PATENT DOCUMENTS

2002/0004160 A1   1/2002  Shimada et al.
2009/0202889 A1   8/2009  Mori
(Continued)

FOREIGN PATENT DOCUMENTS

CN    106207980 A    12/2016
JP    2006-320085 A  11/2006
(Continued)

OTHER PUBLICATIONS

Search Report dated Dec. 23, 2022 from Office Action for Chinese Application No. 202080009583.8 dated Dec. 29, 2022. 3 pgs. (see p. 2, categorizing the cited references).
(Continued)

*Primary Examiner* — James Lee
(74) *Attorney, Agent, or Firm* — Lerner David LLP

(57) ABSTRACT

A secondary battery includes: a plurality of temperature sensing units that is in close contact with an exterior and senses a temperature of respective areas of the exterior; and an insulating film defining an outer surface of the exterior and having electrical insulation, wherein one or more of the plurality of temperature sensing units include: a positive temperature coefficient element; and a negative temperature coefficient element, and the plurality of temperature sensing units are covered by the insulating film. A method for manufacturing the secondary battery, and a battery module are also provided.

8 Claims, 5 Drawing Sheets

(51) Int. Cl.
*H01M 10/48* (2006.01)
*H01M 50/581* (2021.01)

(52) U.S. Cl.
CPC .. *H01M 10/658* (2015.04); *H01M 2010/4271* (2013.01); *H01M 2200/105* (2013.01); *H01M 2200/106* (2013.01)

(56) References Cited

U.S. PATENT DOCUMENTS

| | | |
|---|---|---|
| 2010/0195696 A1 | 8/2010 | Ishikawa et al. |
| 2013/0169261 A1 | 7/2013 | Fendt et al. |
| 2013/0171508 A1 | 7/2013 | Kim |
| 2014/0004393 A1 | 1/2014 | Takahashi et al. |
| 2014/0370338 A1 | 12/2014 | Lim |
| 2015/0094970 A1 | 4/2015 | Bober |
| 2015/0171489 A1 | 6/2015 | Inaba et al. |
| 2015/0221992 A1 | 8/2015 | Bober |
| 2016/0079638 A1 | 3/2016 | Chu et al. |
| 2018/0151922 A1 | 5/2018 | Ito et al. |
| 2019/0072436 A1 | 3/2019 | Golubovic et al. |
| 2021/0328279 A1 | 10/2021 | Jeong et al. |

FOREIGN PATENT DOCUMENTS

| | | |
|---|---|---|
| JP | 4363092 B2 | 11/2009 |
| JP | 2010185689 A | 8/2010 |
| JP | 2010244844 A | 10/2010 |
| JP | 2012227983 A | 11/2012 |
| JP | 2014103055 A | 6/2014 |
| JP | 5978718 B2 | 8/2016 |
| JP | 2017084647 A | 5/2017 |
| JP | 2018088311 A | 6/2018 |
| KR | 2019850002391 | 10/1985 |
| KR | 20010107690 A | 12/2001 |
| KR | 2009-0098522 A | 9/2009 |
| KR | 101287632 B1 | 7/2013 |
| KR | 20130079956 A | 7/2013 |
| KR | 20130089376 A | 8/2013 |
| KR | 20140062575 A | 5/2014 |
| KR | 20140131716 A | 11/2014 |
| KR | 20150091211 A | 8/2015 |
| KR | 101577387 B1 | 12/2015 |
| KR | 20160054503 A | 5/2016 |
| KR | 20160061721 A | 6/2016 |
| KR | 20160144224 A | 12/2016 |
| KR | 101849763 B1 | 4/2018 |
| KR | 101907211 B1 | 10/2018 |
| WO | 2018-139738 A1 | 8/2018 |

OTHER PUBLICATIONS

International Search Report for Application No. PCT/KR2020/008324, dated Sep. 28, 2020, 2 pages.

Extended European Search Report including Written Opinion for Application No. 20835100.7 dated Mar. 1, 2022, pp. 1-6.

SECONDARY BATTERY, METHOD FOR MANUFACTURING THE SECONDARY BATTERY, AND BATTERY MODULE INCLUDING THE SECONDARY BATTERY

CROSS-REFERENCE TO RELATED APPLICATIONS

The present application is a national phase entry under 35 U.S.C. § 371 of International Application No. PCT/KR2020/008324, filed Jun. 26, 2020, published in Korean, which claims the benefit of the priority of Korean Patent Application No. 10-2019-0080175, filed on Jul. 3, 2019, both of which are hereby incorporated by reference in their entireties.

TECHNICAL FIELD

The present invention relates to a secondary battery, a method for manufacturing the secondary battery, and a battery module including the secondary battery, and more particularly, to a secondary battery having a structure which is capable of interrupting current when a temperature of the secondary battery exceeds a predetermined value, and a battery module including the secondary battery.

BACKGROUND ART

Batteries storing electrical energy may be generally classified into primary batteries and a secondary batteries.

DISCLOSURE OF THE INVENTION

Technical Problem

Secondary batteries capable of being repeatedly chargeable and dischargeable need to be secured so that ignition or explosion does not occur when abnormal operation occurs. For example, when a temperature within a secondary battery exceeds a predetermined value due to short circuit or the like of the secondary battery, it is necessary to interrupt current from flowing through the secondary battery.

The secondary battery may be classified into a cylindrical type secondary battery, a prismatic type battery secondary battery, a pouch type secondary battery, and the like according to its structure or manufacturing method. Among them, the pouch type secondary battery has a structure in which an electrode assembly having a structure in which electrodes and separators are alternately disposed in a sheet-shaped pouch exterior is accommodated. In particular, the pouch type secondary battery has been widely used due to its relatively simple process and low manufacturing cost.

However, according to the related art, there is a problem in securing safety because the pouch type secondary battery is not provided with a constitution that is capable of interrupting current when a temperature within the secondary battery abnormally increases.

Technical Solution

According to a first aspect of the present invention for achieving the above object, a secondary battery includes: an electrode assembly; a sheet-like exterior configured to accommodate the electrode assembly; and a plurality of temperature sensing units provided to be inserted into the exterior and each configured to sense a temperature of a respective area of the exterior, wherein the exterior includes: an inner body part configured to define an inner body of the exterior; an insulating film attached on the inner body part to define an outer surface of the exterior, the insulating film having electrical insulation, wherein one or more of the plurality of temperature sensing units include: a positive temperature coefficient element; and a negative temperature coefficient element, wherein the plurality of temperature sensing units are attached to the inner body part, and the plurality of temperature sensing units are covered by the insulating film.

The secondary battery may further include a circuit unit configured to electrically connect the plurality of temperature sensing units to each other, wherein the circuit unit may be attached on the inner body part, and the circuit unit may be covered by the insulating film.

A recess part that is recessed upward may be defined in a bottom surface of the insulating film and in which the plurality of temperature sensing units and the circuit unit are disposed, and distances between the inner body part of the exterior and an outer surface of the insulating film may be the same on (i) an area on which the plurality of temperature sensing units are disposed, (ii) an area on which the circuit unit is disposed, and (iii) an area on which the plurality of temperature sensing units and the circuit unit are not disposed.

The secondary battery may further include an electrode lead having a shape that protrudes outward, wherein the negative temperature coefficient element may be provided in the temperature sensing unit, which is adjacent to the electrode lead, among the plurality of temperature sensing units.

The electrode lead may include a positive electrode lead and a negative electrode lead, and the negative temperature coefficient element may be provided in the temperature sensing unit, which is adjacent to the negative electrode lead, among the plurality of temperature sensing units.

The circuit unit may be configured to connect the plurality of temperature sensing units to each other in a zigzag shape.

The insulating film may include: a first insulating film attached on the inner body part of the exterior, configured to wrap circumferences of the plurality of temperature sensing units and the circuit unit, and having through-holes defined in positions at which the plurality of temperature sensing units and the circuit unit are disposed, respectively; and a second insulating film attached to a surface of an upper portion of the first insulating film to cover the plurality of temperature sensing units and the circuit unit.

According to a second aspect of the present invention for achieving the above object, a battery module includes: the secondary battery; and a control unit configured to receive temperature information of the exterior on an area to which the plurality of temperature sensing units of the secondary battery are attached, wherein, when a temperature on a portion of the area to which the plurality of temperature sensing units are attached exceeds a predetermined value, the control unit (i) interrupts current of the secondary battery or (ii) transmits a warning signal to an outside.

According to a third aspect of the present invention for achieving the above object, a method for manufacturing a secondary battery includes: an inner body part preparation step of preparing an inner body part forming an inner body of a sheet-like exterior; a sensing unit disposition step of disposing a plurality of temperature sensing units on the inner body part; and a film attachment step of attaching an insulating film on the inner body part to cover the plurality of temperature sensing units while wrapping circumferences of the plurality of temperature sensing units.

One or more of the plurality of temperature sensing units may include: a positive temperature coefficient element; and a negative temperature coefficient element.

The method may further include a circuit unit disposition step of disposing a circuit unit that electrically connects the plurality of temperature sensing units to each other on the inner body part, wherein the circuit unit disposition step may be performed after the sensing unit disposition step.

In the circuit unit disposition step, the circuit unit may be disposed on the inner body part of the exterior in a deposition or printing manner.

The insulating film may include a first insulating film and a second insulating film, and the film attachment step may include: a first film attachment step which is performed before the sensing unit disposition step and the circuit unit disposition step and in which the first insulating film having through-holes attached on the inner body part of the exterior; and a second film attachment step which is performed after the sensing unit disposition step and the circuit unit disposition step and in which the second insulating film is attached on a surface of an upper portion of the first insulating film to cover the plurality of temperature sensing units and the circuit unit, and in the sensing unit disposition step and the circuit unit disposition step, with the plurality of temperature sensing units and the circuit unit disposed in the respective through-holes formed in the first insulating film, the first insulting film may wrap circumferences of the plurality of temperature sensing units and the circuit unit.

Advantageous Effects

According to the present invention, when the temperature within the pouch type secondary battery abnormally increases, the current may be interrupted to improve the safety.

MODE FOR CARRYING OUT THE INVENTION

Hereinafter, a secondary battery, a method for manufacturing the secondary battery, and a structure of a battery module according to the present invention will be described with reference to the accompanying drawings.

Secondary Battery

Figure 1:
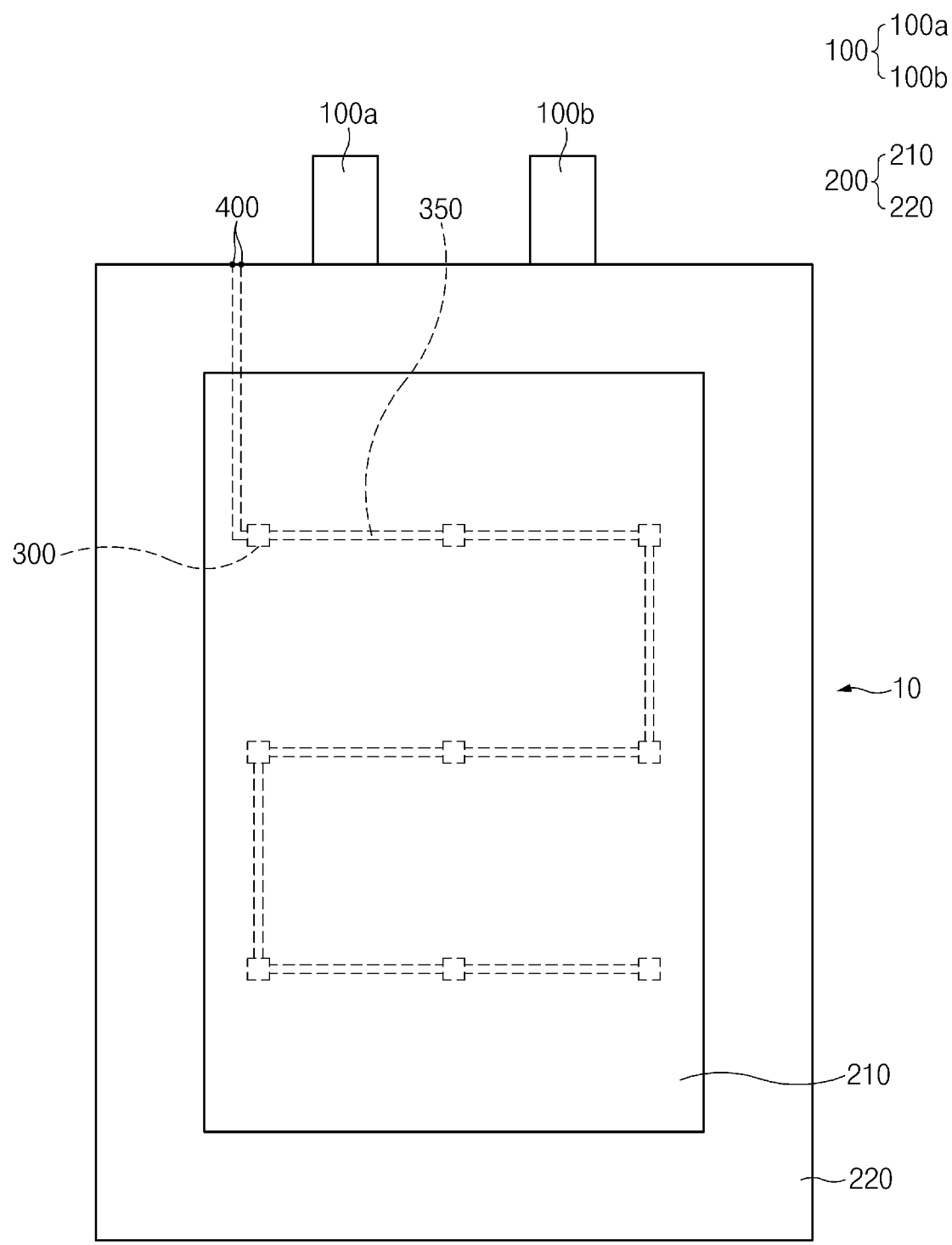
FIG. 1 is a plan view illustrating a structure of a secondary battery according to a first embodiment of the present invention.
Figure 2:
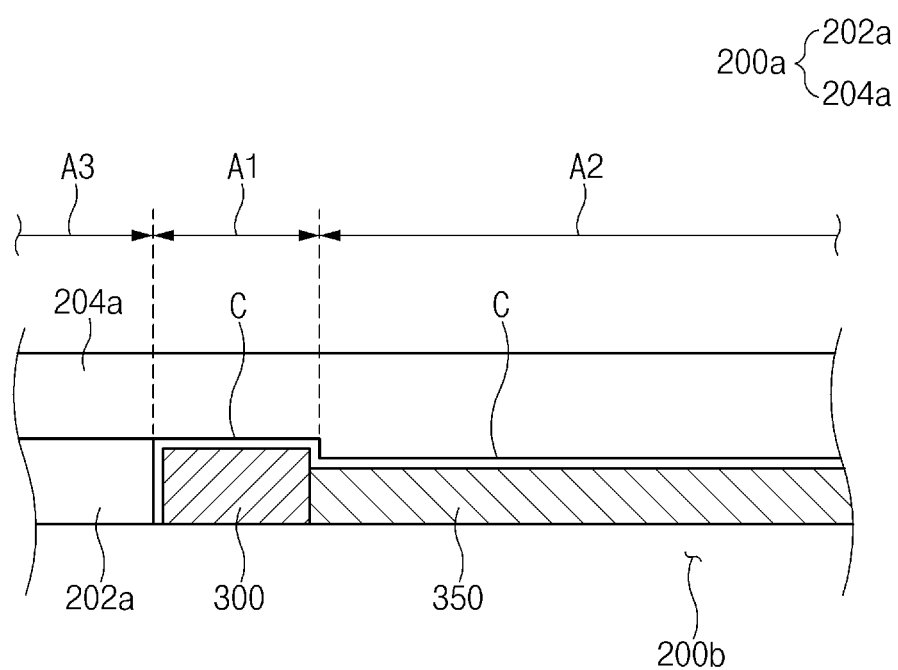
FIG. 2 is a vertical cross-sectional view illustrating a structure of a surface of the secondary battery according to the present invention.
Figure 3:
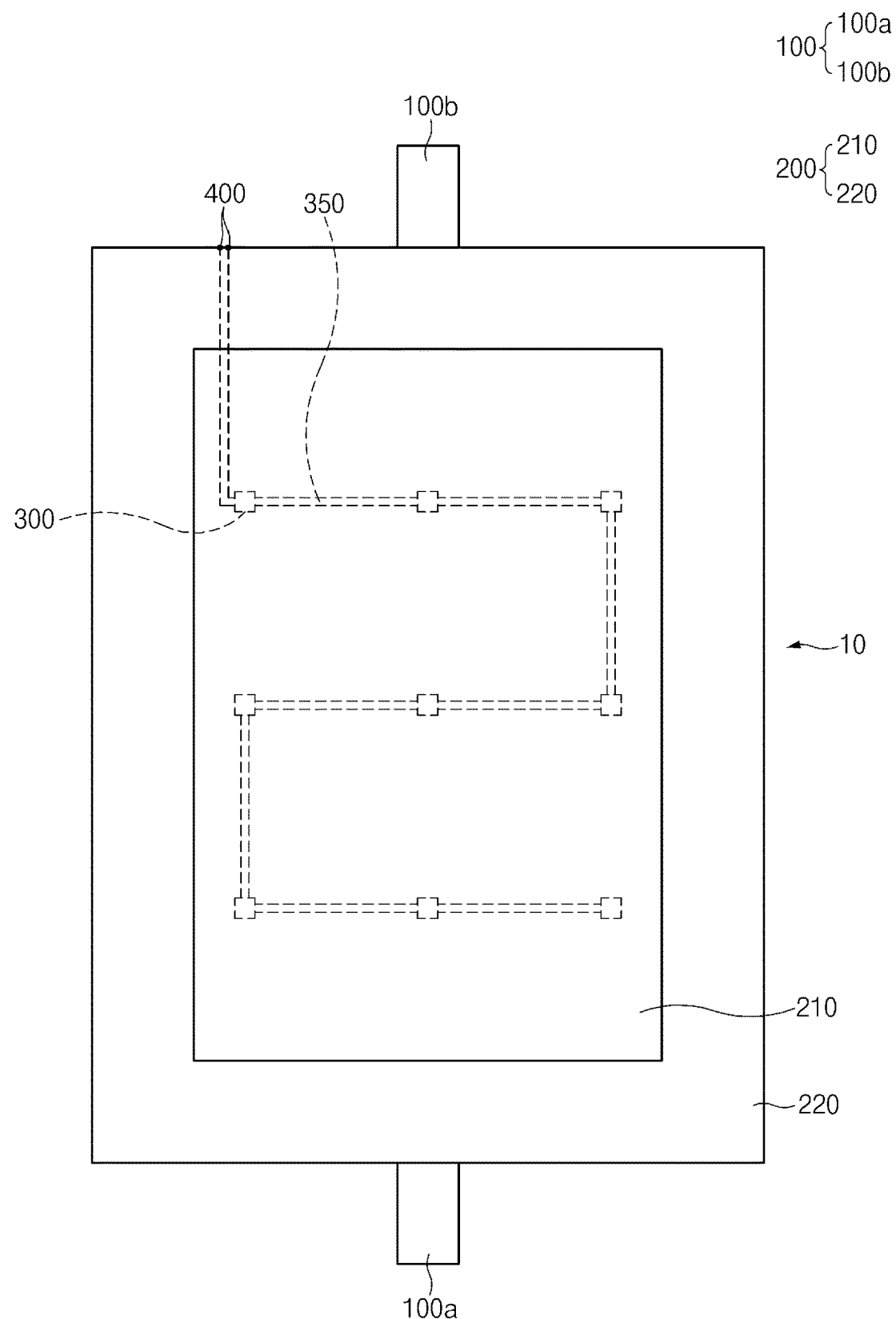
FIG. 3 is a plan view illustrating a structure of a secondary battery according to a second embodiment of the present invention.
Figure 4:
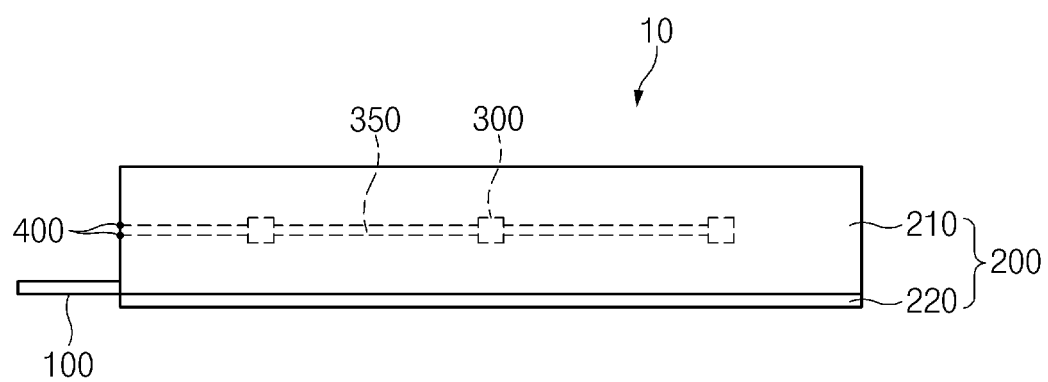
FIG. 4 is a plan view illustrating a structure of a secondary battery according to a third embodiment of the present invention.

FIG. 1 is a plan view illustrating a structure of a secondary battery according to a first embodiment of the present invention, and FIG. 2 is a vertical cross-sectional view illustrating a structure of a surface of the secondary battery according to the present invention. FIG. 3 is a plan view illustrating a structure of a secondary battery according to a second embodiment of the present invention, and FIG. 4 is a plan view illustrating a structure of a secondary battery according to a third embodiment of the present invention.

A secondary battery 10 according to the present invention may include an electrode assembly and a sheet type exterior 200 (hereinafter, referred to as an 'exterior') that accommodates the electrode assembly. The electrode assembly may have a structure in which electrodes and separators are alternately arranged.

As illustrated in FIG. 1, the exterior 200 may include a body part 210, in which an internal space in which the electrode assembly is accommodated is defined, and a sealing part 220 that seals the internal space of the body part 210 from the outside. The sealing part 220 may have a structure in which two sheets are bonded to each other.

In this specification, a surface having a large area among surfaces of the body part 210 of the exterior 200 is referred to as a 'top surface' or a 'bottom surface', and a surface formed around the top surface or the bottom surface is referred to as a 'side surface'. Referring to FIGS. 1, 3, and 4, an area of the body part 210 of the exterior 200, which is illustrated in FIGS. 1 and 3, may be a top surface, and an area of the body part 210 of the exterior 200, which is illustrated in FIG. 4, may be a side surface.

Also, the secondary battery 10 according to the present invention may include an electrode lead 100 having a shape protruding to the outside. The electrode lead 100 may include a positive electrode lead 100a and a negative electrode lead 100b.

As illustrated in FIG. 1, according to the first embodiment of the present invention, the positive electrode lead 100a and the negative electrode lead 100b may be provided at one side of the exterior 200 to protrude in the same direction. However, as illustrated in FIG. 3, according to the second embodiment of the present invention, the positive electrode lead 100a and the negative electrode lead 100b may be respectively provided at one side of the exterior 200 and the other side opposite to the one side to protrude in opposite directions.

The secondary battery 10 according to the present invention may include a plurality of temperature sensing units 300 provided adjacent to the exterior 200. The temperature sensing units 300 may be provided in close contact with the exterior 200. In more detail, as illustrated in FIG. 2, each of the temperature sensing units 300 may be inserted into the exterior 200.

The temperature sensing unit 300 according to the present invention may be configured to sense a temperature in one region of the exterior 200. As described below, information about a temperature in one region of the exterior 200 sensed by the temperature sensing units 300 may be provided to a control unit 20 (see FIG. 5).

As illustrated in FIGS. 1 and 3, the plurality of temperature sensing units 300 may be disposed on a top or bottom surface of the exterior 200. On the other hand, as illustrated in FIG. 4, the plurality of temperature sensing units 300 may be disposed on a side surface of the exterior 200.

Sequentially, referring to the drawings, the secondary battery 10 according to the present invention may further include a circuit unit that electrically connects the plurality of temperature sensing units 300 to each other. Here, as illustrated in FIGS. 1 and 3, the circuit unit 350 may connect the plurality of temperature sensing units 300 to each other in a zigzag shape. Alternatively, as illustrated in FIG. 4, the circuit unit 350 may connect the plurality of temperature sensing units 300 in parallel to each other. Like the temperature sensing unit 300, as illustrated in FIG. 2, the circuit unit 350 may also be inserted into the exterior 200.

Also, the secondary battery 10 according to the present invention may further include a terminal unit 400 disposed on a surface of the exterior 200 and connected to one of the plurality of temperature sensing units 300 by the circuit unit 350. FIGS. 1, 3, and 4 illustrate a case in which the terminal unit 400 is provided at one side of the exterior 200 on which the electrode lead 100 is disposed.

According to the present invention, each of the plurality of temperature sensing units 300 provided in the secondary battery 10 may include a positive temperature coefficient (PTC) element. Also, at least one of the plurality of temperature sensing units 300 may include a negative temperature coefficient (NTC) element. At least one of the plurality of temperature sensing units 300 may include the PTC element and the NTC element.

The PTC element represents an element in which electrical resistance increases rapidly when the temperature increases, and the NTC element represents an element in which electrical resistance increases when the temperature decreases.

According to the present invention, since at least one of the plurality of temperature sensing units includes all the PTC element and the NTC element, more reliable information with respect to the temperature in a specific region of the exterior may be obtained.

That is, when only one type of temperature measurement element is provided in the temperature sensing units, the temperature information in the specific region of the exterior is limited to information obtained from only one type of temperature measurement element. Thus, even if the temperature information obtained from one type of temperature measurement element is wrong, it is not known that the information is wrong, thereby deteriorating the reliability of the temperature information in the specific region of the exterior.

However, according to the present invention, since at least one temperature sensing unit includes two types of temperature measurement elements (i.e., a PTC element and an NTC element), the temperature information in the specific region of the exterior may also be obtained through the two channels. If the temperature information obtained from one type of temperature measurement element is wrong, the error of the temperature information may be revealed through cross-checking of the information by using the temperature information obtained from the different type of temperature measurement elements. Thus, according to the present invention, the reliability of information on the temperature in the specific region of the exterior may be improved.

It is considered that each of the plurality of temperature sensing units includes the NTC element, and at least one of the plurality of temperature sensing units includes the PTC element. However, in general, in the case of the NTC element, since the NTC element is more expensive than the PTC element, it may not be desirable in terms of economics when the temperature sensing units are configured in the above-described structure.

In view of the safety for the temperature of the secondary battery, it may be preferable that the temperature sensing unit provided with two kinds of temperature measurement elements among the plurality of temperature sensing units is provided in a region in which the temperature is usually high in the secondary battery. This is because there is also high possibility of abnormal temperature increase at the position at which an amount of heat is large.

In the secondary battery, a region in which the electrode assembly and the electrode lead are connected to each other generally has a relatively high temperature. In order to connect the electrode assembly to the electrode lead, a welding process is performed. Here, a large amount of heat may be generated on an area on which materials different from each other are bonded to each other through the welding. This is because, when current flowing through the electrode assembly having a relatively large width flows through the electrode lead having a relatively narrow width, a large amount of heat is generated in the electrode lead due to an increase in electrical resistance due to the narrow width of the electrode lead.

Thus, the NTC element may be provided in the temperature sensing unit adjacent to the electrode lead among the plurality of temperature sensing units 300. Referring to FIG. 1, the NTC element may be provided in at least one of the upper temperature sensing units that are closest to the electrode lead 100 among the plurality of temperature sensing units 300.

In general, since thermal conductivity of a material (for example, copper) used for the negative electrode lead is greater than that of a material (for example, aluminum) used for the positive electrode lead, it is common that a large amount of heat is generated in the negative electrode lead. Also, when the secondary battery is discharged, since charges flow from the negative electrode lead to the positive electrode lead, it is common that a relatively high temperature is generated on the area on which the negative electrode lead and the electrode assembly are electrically connected to each other.

Thus, the NTC element may be provided in the temperature sensing unit adjacent to the negative electrode lead 100b among the plurality of temperature sensing units 300. Referring to FIG. 3, the NTC element may be provided in the temperature sensing unit that is provided at a central portion in the upper temperature sensing units 300, which are closest to the negative electrode lead 100b, among the plurality of temperature sensing units 300.

Referring to FIGS. 1 and 2, the secondary battery 10 according to the present invention may further include an insulating film 200a having electrical insulation. The insulating film 200a may form an outer surface of the exterior 200 on at least a partial area. The insulating film 200a may be a portion of the exterior 200.

As illustrated in FIG. 2, the exterior 200 may have a layered structure including an insulating film 200a and an inner body part 200b defining an inner body of the exterior 200, and the insulating film 200a may be attached on the inner body part 200b. Similarly, the temperature sensing unit 300 and the circuit unit 350 may also be attached on the inner body part 200b of the exterior 200.

As illustrated in FIG. 2, the insulating film 200a may be provided to cover the plurality of temperature sensing units 300. That is, the plurality of temperature sensing units 300 may be covered by the insulating film 200a. Also, the insulating film 200a may be provided to cover the circuit unit 350. That is, the circuit unit 350 may also be covered by the insulating film 200a.

As described above, the temperature sensing unit 300 and the circuit unit 350 may be attached to the inner body part 200b of the exterior 200. Since the insulating film 200a is provided to cover the plurality of temperature sensing units 300 and the circuit unit 350, an empty space in which the plurality of temperature sensing units 300 and the circuit unit 350 are provided may be defined inside the insulating film 200a.

That is, as illustrated in FIG. 2, a recess part C that is recessed upward may be defined in a bottom surface of the insulating film 200a so that the plurality of temperature sensing units 300 and the circuit unit 350 are disposed. Here, as illustrated in FIG. 2, since each of the temperature sensing units 300 has a thickness greater than that of the circuit unit 350, the recess part C may have a stepped shape corresponding to a difference in thickness between the temperature sensing unit 300 and the circuit unit 350.

As illustrated in FIG. 2, an area of the exterior 200, on which the insulating film 200a is disposed, may be largely divided into (i) an area A1 on which the plurality of temperature sensing units are disposed, (ii) an area A2 on which the circuit unit 350 is disposed, and (iii) an area A3 on which the plurality of temperature sensing units 300 and the circuit unit 350 are not disposed. Here, in the areas A1 to A3, distances between the inner body part 200b of the exterior 200 and an outer surface of the insulating film 200a may be the same. Thus, according to the present invention, even if the plurality of temperature sensing units 300 and the circuit unit 350 are attached to the secondary battery 10, it is possible to prevent the outer surface of the exterior 200 from being unevenly formed on the area on which the temperature sensing units 300 and the circuit unit 350 are attached.

The insulating film 200a may have a layered structure. That is, as illustrated in FIG. 2, the insulating film 200a may include a first insulating film 202a and a second insulating film 204a.

As illustrated in FIG. 2, the first insulating film 202a may be attached on the inner body part 200b of the exterior 200. Here, the first insulating film 202a wraps circumferences of the temperature sensing units 300 and the circuit units 350. Here, a through-hole may be defined in a position at which the temperature sensing units 300 and the circuit unit 350 are disposed so that the temperature sensing units 300 and the circuit unit 350 are attached to the inner body part 200b.

Also, the second insulting film 202b may be attached to a surface of an upper portion of the first insulating film 202a and may cover the temperature sensing units 300 and the circuit unit 350. The first insulating film 202a and the second insulating film 202b may be made of the same material. The insulating film 200a may include nylon. Also, the insulating film 200a may further include PET, PCT, or PEN. When the insulating film 200a includes nylon, a thickness of nylon may be about 15 μm, and when the insulating film 200a includes PET, PCT or PEN, the thickness of PET, PCT or PEN may be about 12 μm.

Battery Module

Figure 5:
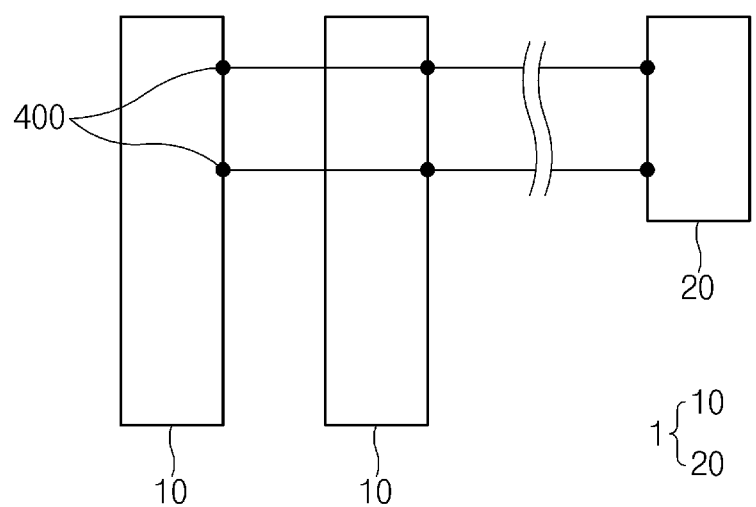
FIG. 5 is a plan view illustrating a structure of a battery module according to the present invention.

FIG. 5 is a plan view illustrating a structure of a battery module according to the present invention.

The battery module 1 according to the present invention may include a secondary battery 10. The secondary battery 10 may be provided in plurality, and descriptions of a structure of the secondary battery 10 will be cited from the above descriptions.

Also, the battery module 1 according to the present invention may include a control unit 20 receiving information with respect to a temperature of an exterior 200 (see FIG. 1) on areas on which temperature sensing units 300 (see FIG. 1) of the secondary batteries 10 are attached.

According to the present invention, the temperature sensing units mounted on the plurality of secondary batteries 10 sense the temperature of the exterior on the area to which the temperature sensing units are attached to transmit the sensed temperature information to the control unit 20. Thereafter, when a temperature on a portion of the areas to which the temperature sensing units attached to the plurality of secondary batteries 10 are attached exceeds a predetermined value, the control unit 20 may (i) interrupt current of the secondary batteries to which the temperature sensing units, which transmit information on the temperature that exceeds the predetermined value, are attached or may (ii) transmit a warning signal to the outside. A control method of the control unit in the battery module according to the present invention will be described in more detail as follows.

The control unit 20 of the battery module 1 receives information on a temperature from each of the PTC element and the NTC element, which are provided in the temperature sensing unit of the secondary battery 10.

According to the present invention, the control unit may determine whether the temperature provided from the NTC element (i) is equal to or less than a first reference temperature, (ii) is equal to or less than a second reference temperature that exceeds the first reference temperature and is greater than the first reference temperature, or (iii) exceeds the second reference temperature.

Also, according to the present invention, the control unit determines whether the temperature provided from the PTC element (i) is equal to or less than a third reference temperature or (ii) exceeds the third reference temperature.

Here, when it is determined that the temperature provided from the NTC element exceeds the first reference temperature, the control unit transmits a first warning signal to the outside. Thereafter, when it is determined that the temperature provided from the NTC element exceeds the second reference temperature, the control unit operates as follows according to the temperature provided from the PTC element of the temperature sensing unit provided with the NTC element.

When the temperature provided from the NTC element exceeds the second reference temperature, and also, when the temperature provided from the PTC element exceeds the third reference temperature, the control unit interrupts the current of the secondary battery provided with the temperature sensing unit including the NTC element and the PTC element.

On the other hand, when the temperature provided from the NTC element exceeds the second reference temperature, and also, when the temperature provided from the PTC element is equal to or less than the third reference temperature, the control unit transmits a second warning signal to the outside.

The second reference temperature and the third reference temperature may be the same as each other. When the second reference temperature and the third reference temperature are the same as each other, since a temperature that serves as a reference for interrupting the current of the secondary battery is provided in a single, stable control and simplified control of the control unit may be enabled. Here, the fact that the second reference temperature and the third reference temperature are 'the same' as each other means that the second reference temperature is not only numerically exactly the same as the third reference temperature, but also a difference between the second reference temperature and the third reference temperature is insignificant. Thus, it should be interpreted to include a case in which a person skilled in the art may determine that the two temperatures are substantially the same. Alternatively, in contrast, the second reference temperature may be greater than the third reference temperature.

In the battery module according to the present invention, an operation of the above-described control unit relates to a case in which information on the temperatures is provided from the temperature sensing unit including the PTC element and the NTC element. Thus, when the temperature information is provided from the temperature sensing unit provided with only the PTC element, the control unit may operate as follows.

When the temperature provided from the PTC element exceeds the third reference temperature, the control unit may interrupt current of the secondary battery provided with the temperature sensing unit including the PTC element. The control unit may transmit a warning signal to the outside.

When the current of the secondary battery is interrupted by the above algorithm in the battery module according to the present invention, the interruption may be performed permanently or temporarily. The permanent interruption of the current of the secondary battery may mean that the current is still interrupted even when the temperature of the secondary battery returns to a normal temperature. Also, when the current of the secondary battery is performed temporarily, it may mean that the current of the secondary battery flows again when the temperature of the secondary battery returns to the normal temperature.

According to the present invention, since each of the plurality of secondary batteries constituting the battery module is provided with at least one temperature sensing unit provided with the PTC element and NTC element, the reliable of the control of the secondary battery may be improved based on the information on the temperature provided from the PTC element and the NTC element.

Method for Manufacturing Secondary Battery

Referring to FIGS. 1 to 4, a method for manufacturing a secondary battery according to the present invention may include an inner body part preparation step of preparing an inner body part 200b forming an inner body of a sheet-like exterior 200, a sensing unit disposition step of disposing a plurality of temperature sensing units 300 that sense a temperature of one area of the exterior 200 on the inner body part 200b, a circuit unit disposition step of disposing a circuit unit 350 that electrically connects the plurality of temperature sensing units 300 to each other on the inner body part 200b, and a film attachment step of attaching an insulating film 200a on the inner body part 200b of the exterior 200 so that the insulating film 200a is attached on the inner body part 200b to cover the plurality of temperature sensing units 300 while wrapping circumferences of the plurality of temperature sensing units 300.

In the circuit unit disposition step, the circuit unit 350 may be disposed on the inner body part 200b of the exterior 200 in a deposition or printing manner. Also, the circuit unit disposition step may be performed after the sensing unit disposition step.

As described above, the insulating film 200a may include a first insulating film 202a and a second insulating film 204a. Thus, the film attachment step of the method for manufacturing the secondary battery according to the present invention may include a first film attachment step which is performed before the sensing unit disposition step and the circuit unit disposition step and in which the first insulating film 202a having the through-hole is attached to the inner body part 200b of the exterior 200.

Also, the film attachment step may further include a second film attachment step which is performed after the sensing unit disposition step and the circuit unit disposition step and in which the second insulating film 204a is attached to a surface of an upper portion of the first insulating film 202a to cover the plurality of temperature sensing units 300 and the circuit unit 350.

As described above, in the first film attachment step, a through-hole may be formed in the first insulating film 202a. Thus, in the sensing unit disposition step, the plurality of temperature sensing units 300 may be disposed on an area of the surface of the inner body part 20b of the exterior 200, on which the first insulating film 202a is not attached in the first film attachment step (that is, an area in which the through-hole is formed). Also, in the circuit unit disposition step, the circuit unit 350 may be disposed on the area of the surface of the inner body part 20b of the exterior 200, on which the first insulating film 202a is not attached in the first film attachment step (that is, the area in which the through-hole is formed). That is, according to the present invention, in the sensing unit disposition step and the circuit unit disposition step, since the temperature sensing units 300 and the circuit unit 350 are provided in the through-hole of the first insulating film 202a, the first insulting film 202a may wrap the circumferences of the temperature sensing units 300 and the circuit unit 350.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A secondary battery comprising:
   an electrode assembly;
   a sheet-like exterior configured to accommodate the electrode assembly; and
   a plurality of temperature sensing units provided to be inserted into the exterior and each configured to sense a temperature of a respective area of the exterior,
   wherein the exterior comprises:
   an inner body part configured to define an inner body of the exterior;
   an insulating film attached on the inner body part to define an outer surface of the exterior, the insulating film having electrical insulation, and the insulating film covering the plurality of temperature sensing units,
   wherein the insulating film comprises:
     a first insulating film attached on the inner body part of the exterior, configured to wrap circumferences of the plurality of temperature sensing units and the first insulating film having through-holes defined in positions at which the plurality of temperature sensing units are disposed such that each one of the plurality of temperature sensing units is received in a respective one of the through-holes, respectively; and
     a second insulating film attached to a surface of an upper portion of the first insulating film to cover the plurality of temperature sensing units and the through-holes in which the plurality of temperature sensing units are received,
   wherein one or more of the plurality of temperature sensing units comprise:
     a positive temperature coefficient element; and
     a negative temperature coefficient element, and
   wherein the plurality of temperature sensing units are attached to the inner body part.

2. The secondary battery of claim 1, further comprising a circuit unit configured to electrically connect the plurality of temperature sensing units to each other, wherein the circuit unit is attached on the inner body part, and the circuit unit is covered by the insulating film.

3. The secondary battery of claim 2, wherein a recess part that is recessed upward is defined in a bottom surface of the insulating film and in which the plurality of temperature sensing units and the circuit unit are disposed, and distances between the inner body part of the exterior and an outer surface of the insulating film are the same on (i) an area on which the plurality of temperature sensing units are disposed, (ii) an area on which the circuit unit is disposed, and (iii) an area on which the plurality of temperature sensing units and the circuit unit are not disposed.

4. The secondary battery of claim 1, further comprising an electrode lead having a shape that protrudes outward, wherein the negative temperature coefficient element is provided in the temperature sensing unit, which is adjacent to the electrode lead, among the plurality of temperature sensing units.

5. The secondary battery of claim 4, wherein the electrode lead comprises a positive electrode lead and a negative electrode lead, and the negative temperature coefficient element is provided in the temperature sensing unit, which is adjacent to the negative electrode lead, among the plurality of temperature sensing units.

6. The secondary battery of claim 2, wherein the circuit unit is configured to connect the plurality of temperature sensing units to each other in a zigzag shape.

7. The secondary battery of claim 2, wherein the first insulating film is configured to wrap a circumference of the circuit unit, the first insulating film having a second through-hold defined in a position at which the circuit unit is disposed such that the circuit unit is received in the second through-hole, wherein the second insulating film covers the circuit unit and the second through-hole in which the circuit unit received.

8. A battery module comprising:

the secondary battery of claim 1; and a control unit configured to receive temperature information of the exterior on an area to which the plurality of temperature sensing units of the secondary battery are attached, wherein, when a temperature on a portion of the area to which the plurality of temperature sensing units are attached exceeds a predetermined value, the control unit (i) interrupts current of the secondary battery or (ii) transmits a warning signal to an outside.

* * * * *